(12) United States Patent  
Glickfield et al.

(10) Patent No.: US 9,386,004 B2  
(45) Date of Patent: Jul. 5, 2016

(54) PEER BASED AUTHENTICATION

(71) Applicant: QUALCOMM Incorporated, San Diego, CA (US)

(72) Inventors: Sarah Glickfield, Jerusalem (IL); Isaac David Guedalia, Bet Shemesh (IL); Ravinder Paul Chandhok, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/520,338

(22) Filed: Oct. 21, 2014

(65) Prior Publication Data

US 2015/0113621 A1    Apr. 23, 2015

Related U.S. Application Data

(60) Provisional application No. 61/894,828, filed on Oct. 23, 2013, provisional application No. 61/904,384, filed on Nov. 14, 2013.

(51) Int. Cl.
*H04W 88/02* (2009.01)
*H04L 29/06* (2006.01)
*H04L 12/58* (2006.01)
*H04W 12/06* (2009.01)
*H04L 12/22* (2006.01)

(52) U.S. Cl.
CPC .............. *H04L 63/08* (2013.01); *H04L 51/046* (2013.01); *H04L 63/0853* (2013.01); *H04W 12/06* (2013.01)

(58) Field of Classification Search
CPC ... H04L 9/0844; H04L 9/32; H04L 29/08621; H04L 29/12245; H04L 63/0892; H04W 12/06; H04N 21/4334; H04N 21/858; H04N 7/17318
See application file for complete search history.

(56) References Cited

U.S. PATENT DOCUMENTS

| 7,194,004 | B1 * | 3/2007 | Thomsen .............. H04L 63/101 370/401 |
| 8,156,332 | B2 | 4/2012 | Simon |
| 8,250,632 | B1 | 8/2012 | Staddon |

(Continued)

FOREIGN PATENT DOCUMENTS

EP    1708527 A1    10/2006

OTHER PUBLICATIONS

International Search Report and Written Opinion—PCT/US2014/061967—ISA/EPO—Feb. 3, 2015.

(Continued)

*Primary Examiner* — Venkat Perungavoor
(74) *Attorney, Agent, or Firm* — Muncy, Geissler, Olds & Lowe, P.C.

(57) ABSTRACT

The disclosure is related to confirming an identity of a first user of a first user device. An aspect includes receiving a request to confirm the identity of the first user, determining whether or not there is a relationship between the first user or the first user device and a second user of a second user device or the second user device based on a first list of user interactions associated with the first user device and a second list of user interactions associated with the second user device, and confirming the identity of the first user based on determining that there is a relationship between the first user or the first user device and the second user or the second user device.

28 Claims, 12 Drawing Sheets

(56) References Cited

U.S. PATENT DOCUMENTS

| | | | |
|---|---|---|---|
| 8,302,164 B2 | 10/2012 | Lunt | |
| 8,504,831 B2 | 8/2013 | Pratt et al. | |
| 8,549,590 B1 | 10/2013 | De Villiers Prichard et al. | |
| 8,572,387 B2 | 10/2013 | Narayanan et al. | |
| 8,590,021 B2 | 11/2013 | Steeves et al. | |
| 2004/0083394 A1 | 4/2004 | Brebner et al. | |
| 2008/0009266 A1* | 1/2008 | Yamasaki | H04W 12/12 455/411 |
| 2008/0031209 A1* | 2/2008 | Abhishek | H04W 8/005 370/338 |
| 2010/0228767 A1 | 9/2010 | Slinker et al. | |
| 2011/0143754 A1* | 6/2011 | Jiang | H04M 15/00 455/432.1 |
| 2012/0115440 A1* | 5/2012 | Naito | G06Q 10/00 455/411 |
| 2012/0252516 A1* | 10/2012 | Miyabayashi | H04W 4/02 455/515 |
| 2013/0086245 A1* | 4/2013 | Lu | G06F 1/3212 709/223 |
| 2013/0090088 A1 | 4/2013 | Chevsky et al. | |
| 2014/0244834 A1* | 8/2014 | Guedalia | H04L 67/16 709/224 |

OTHER PUBLICATIONS

Chow R., et al., "Authentication in the Clouds: A Framework and its Application to Mobile Users," Proceedings of the 2010 ACM workshop on Cloud computing security workshop, CCSW'10, Oct. 8, 2010, pp. 1-6.

Guo B., et al., "From the internet of things to embedded intelligence," 2012, pp. 1-29.

Koster M.J., "Data Models for the Internet of Things: User Identity and Agency on the Internet of Things," Jan. 21, 2013, pp. 6.

* cited by examiner

PEER BASED AUTHENTICATION

CROSS-REFERENCE TO RELATED APPLICATIONS

The present Application for Patent claims the benefit of Provisional Application No. 61/894,828, entitled "PEER-BASED AUTHENTICATION," filed Oct. 23, 2013, and Provisional Application No. 61/904,384, entitled "SECURITY IN PEER TABLE TRANSMISSION," filed Nov. 14, 2013, both of which are assigned to the assignee hereof and hereby expressly incorporated by reference herein in their entirety.

TECHNICAL FIELD

The disclosure is related to peer based authentication.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

To protect the privacy and security of user information stored at a remote server (e.g., a server accessible over the Internet), the remote server will determine whether or not the user is authorized to access the information. Similarly, for the user to perform some action at or with the assistance of the remote server, such as making a bank transfer, the remote server will determine whether or not the user is authorized to perform the action. Typically, determining whether or not a user is authorized to access information or perform an action includes some way of authenticating that the user is who he says that he is. That is, if the remote server can verify that the user is the owner of the user information or the bank account (authentication), the user is allowed to access the information or make the bank transfer (authorization).

Client-server user authentication is typically performed using a unique key known only to the client and the remote server. This can be a very limited system, however, because if the key becomes known to a malicious third party, it is no longer secure. Additionally, the user may have to remember multiple "username" and "password" combinations for each website and/or application the user would like to log onto.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments disclosed herein in a simplified form to precede the detailed description presented below.

The disclosure is related to confirming an identity of a first user of a first user device. A method for confirming an identity of a first user of a first user device includes receiving a request to confirm the identity of the first user, determining whether or not there is a relationship between the first user or the first user device and a second user of a second user device or the second user device based on a first list of user interactions associated with the first user device and a second list of user interactions associated with the second user device, and confirming the identity of the first user based on determining that there is a relationship between the first user or the first user device and the second user or the second user device.

An apparatus for confirming an identity of a first user of a first user device includes logic configured to receive a request to confirm the identity of the first user, logic configured to determine whether or not there is a relationship between the first user or the first user device and a second user of a second user device or the second user device based on a first list of user interactions associated with the first user device and a second list of user interactions associated with the second user device, and logic configured to confirm the identity of the first user based on determining that there is a relationship between the first user or the first user device and the second user or the second user device.

An apparatus for confirming an identity of a first user of a first user device includes means for receiving a request to confirm the identity of the first user, means for determining whether or not there is a relationship between the first user or the first user device and a second user of a second user device or the second user device based on a first list of user interactions associated with the first user device and a second list of user interactions associated with the second user device, and means for confirming the identity of the first user based on determining that there is a relationship between the first user or the first user device and the second user or the second user device.

A non-transitory computer-readable medium for confirming an identity of a first user of a first user device includes at least one instruction to receive a request to confirm the identity of the first user, at least one instruction to determine whether or not there is a relationship between the first user or the first user device and a second user of a second user device or the second user device based on a first list of user interactions associated with the first user device and a second list of user interactions associated with the second user device, and at least one instruction to confirm the identity of the first user based on determining that there is a relationship between the first user or the first user device and the second user or the second user device.

Other objects and advantages associated with the mechanisms disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
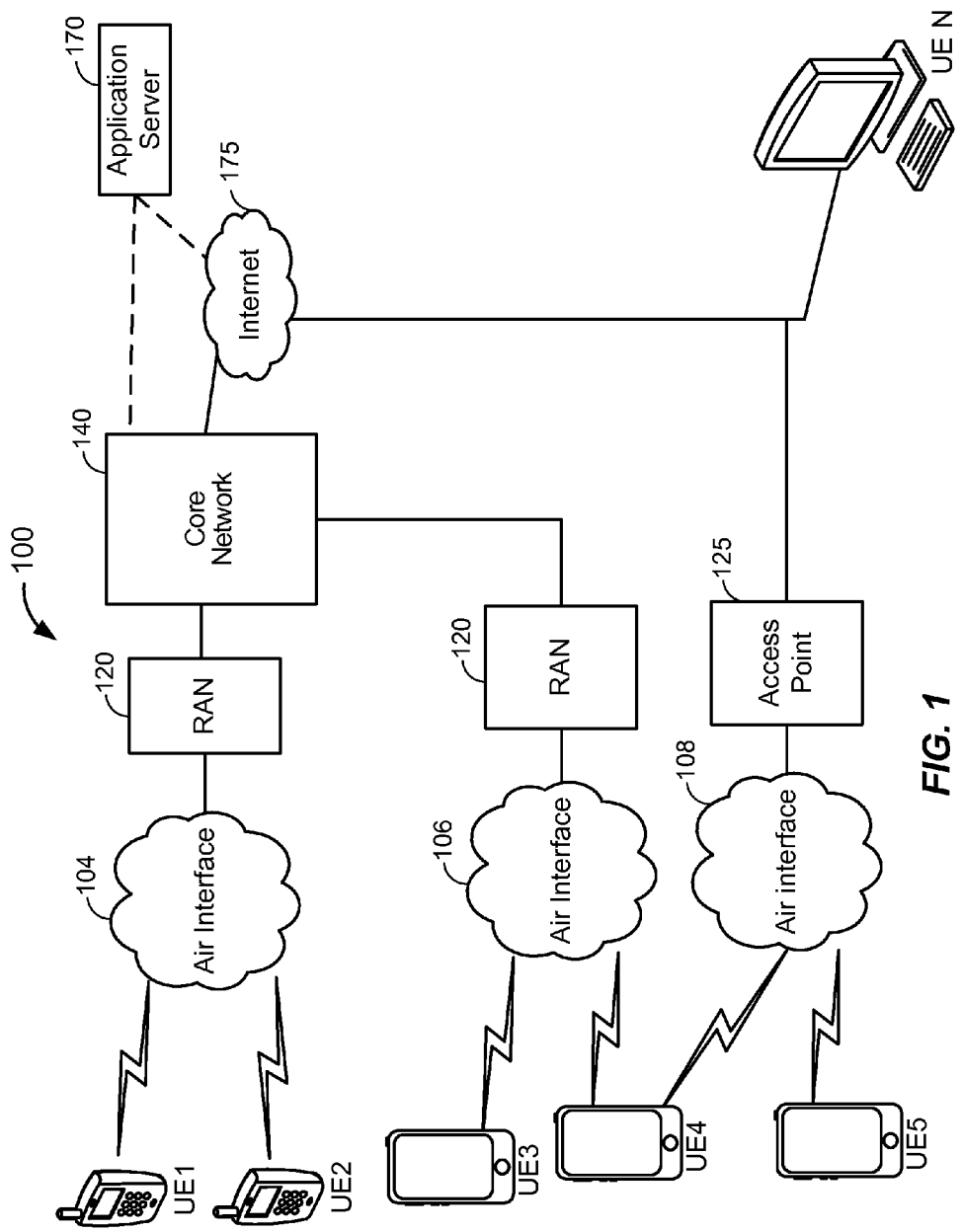
FIG. 1 illustrates a high-level system architecture of a wireless communications system in accordance with an aspect of the disclosure.

The present Application is related to Provisional Application No. 61/769,130, entitled "AN IMPLICIT METHOD FOR CREATING RELATIONSHIPS BETWEEN INTERNET OF THINGS (IOT) DEVICES," filed Feb. 25, 2013, and assigned to the assignee hereof and hereby expressly incorporated by reference herein in its entirety.

The disclosure is related to confirming an identity of a first user of a first user device. An aspect includes receiving a request to confirm the identity of the first user, determining whether or not there is a relationship between the first user or the first user device and a second user of a second user device or the second user device based on a first list of user interactions associated with the first user device and a second list of user interactions associated with the second user device, and confirming the identity of the first user based on determining that there is a relationship between the first user or the first user device and the second user or the second user device.

These and other aspects are disclosed in the following description and related drawings to show specific examples relating to exemplary embodiments of security in peer table transmission. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touch-screen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1... N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. As will be described below in more detail, the server 170 is configured to support one or more communication services (e.g., Voice-over-Internet Protocol (VoIP) sessions, Push-to-Talk (PTT) sessions, group communication sessions, social networking services, etc.) for UEs that can connect to the server 170 via the core network 140 and/or the Internet 175, and/or to provide content (e.g., web page downloads) to the UEs.

Figure 2:
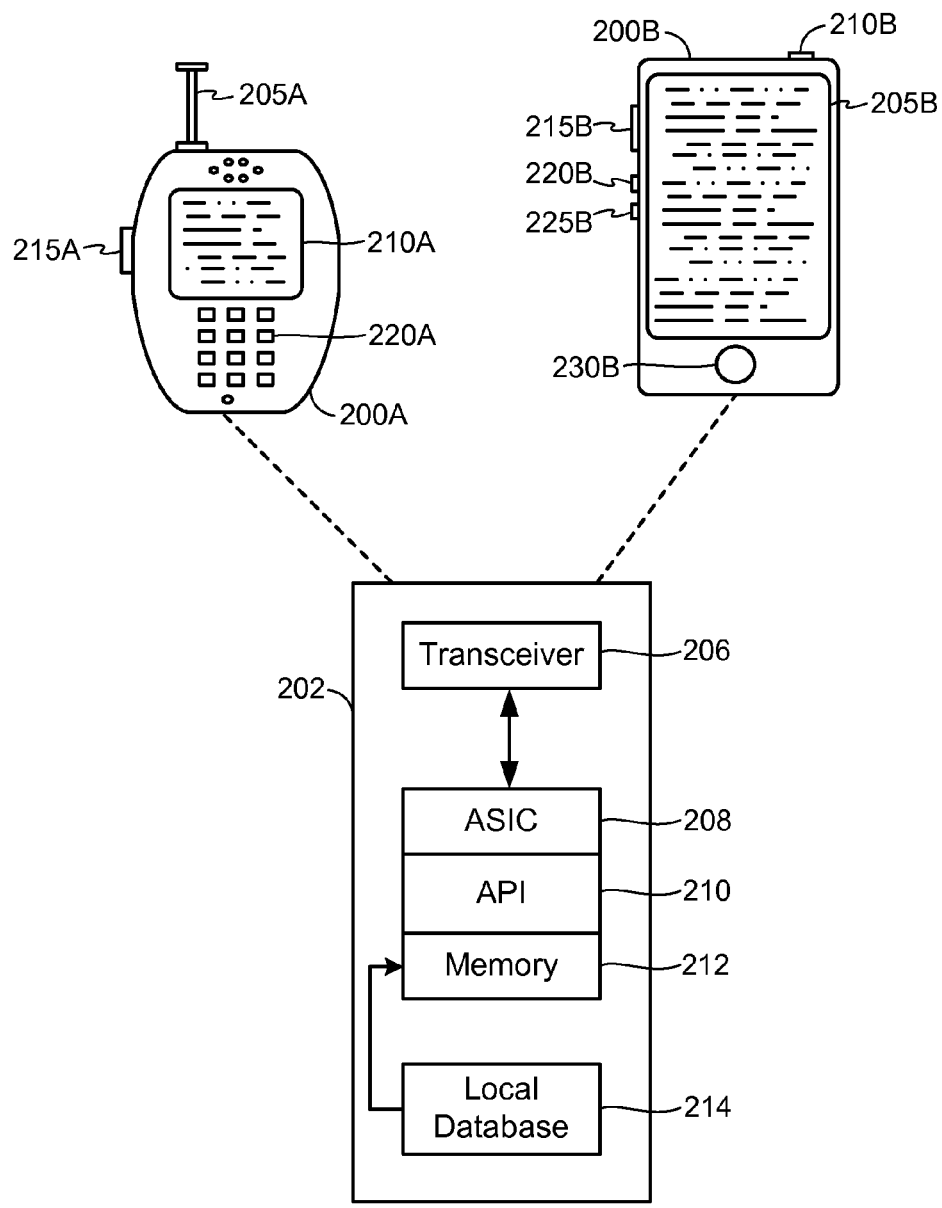
FIG. 2 illustrates examples of user equipments (UEs) in accordance with embodiments of the disclosure.

FIG. 2 illustrates examples of UEs (i.e., client devices) in accordance with embodiments of the invention. Referring to FIG. 2, UE 200A is illustrated as a calling telephone and UE 200B is illustrated as a touchscreen device (e.g., a smart phone, a tablet computer, etc.). As shown in FIG. 2, an external casing of UE 200A is configured with an antenna 205A, display 210A, at least one button 215A (e.g., a PTT button, a power button, a volume control button, etc.) and a keypad 220A among other components, as is known in the art. Also, an external casing of UE 200B is configured with a touchscreen display 205B, peripheral buttons 210B, 215B, 220B and 225B (e.g., a power control button, a volume or vibrate control button, an airplane mode toggle button, etc.), at least one front-panel button 230B (e.g., a Home button, etc.), among other components, as is known in the art. While not shown explicitly as part of UE 200B, the UE 200B can include one or more external antennas and/or one or more integrated antennas that are built into the external casing of UE 200B, including but not limited to WiFi antennas, cellular antennas, satellite position system (SPS) antennas (e.g., global positioning system (GPS) antennas), and so on.

While internal components of UEs such as the UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., application server 170, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can store applications not actively used in memory 212, as well as other data. The local database 214 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 200A, 200B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the invention is not limited to the illustrated features or arrangement.

The wireless communication between the UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 3:
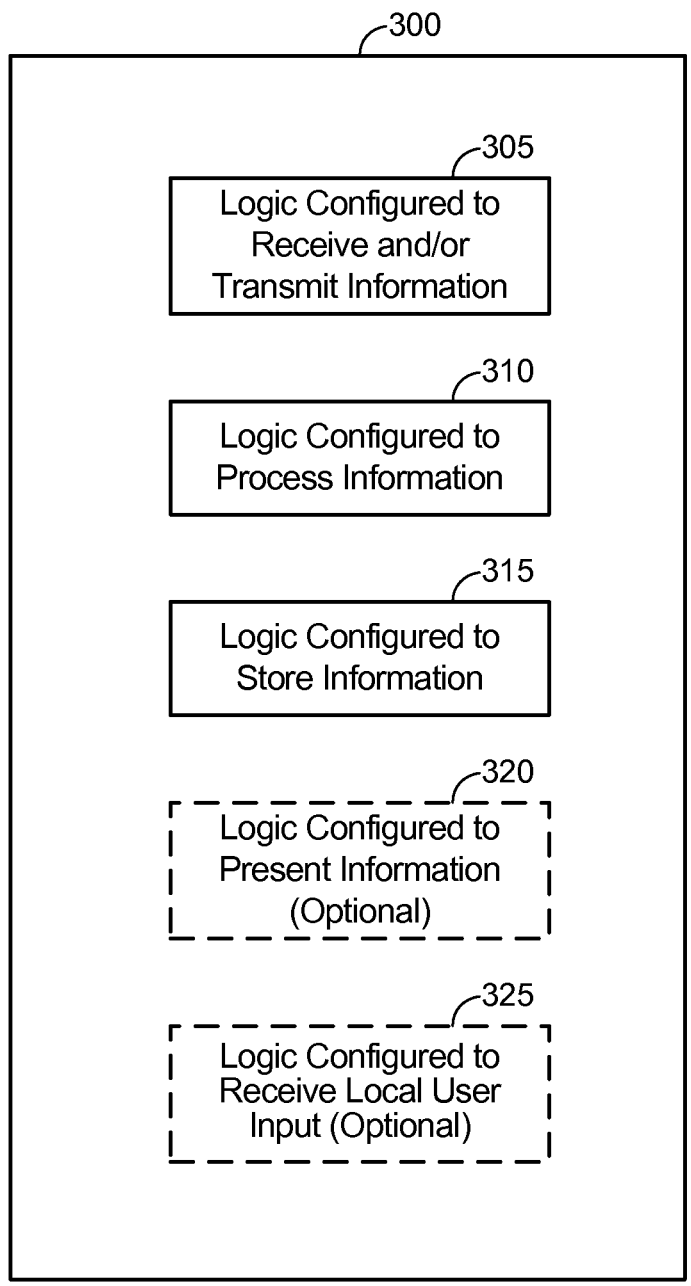
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to UEs 200A or 200B, any component of the RAN 120, any component of the core network 140, any components coupled with the core network 140 and/or the Internet 175 (e.g., the server 170), and so on. Thus, communication device 300 can correspond to any electronic device that is configured to communicate with (or facilitate communication with) one or more other entities over the wireless communications system 100 of FIG. 1.

Referring to FIG. 3, the communication device 300 includes logic configured to receive and/or transmit information 305. In an example, if the communication device 300 corresponds to a wireless communications device (e.g., UE 200A or 200B, AP 125, a BS, Node B or eNodeB in the RAN 120, etc.), the logic configured to receive and/or transmit information 305 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., server 170, etc.), the logic configured to receive and/or transmit information 305 can correspond to an Ethernet card, in an example, that connects the network-based server to other communication entities via an Ethernet protocol. For example, where the communication device 300 corresponds to or includes an authentication server, as described herein, the logic configured to receive and/or transmit information 305 may include logic configured to receive a request to confirm the identity of the first user and/or logic configured to confirm the identity of the first user based on determining that there is a relationship between the first user or the first user device and the second user or the second user device. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, where the communication device 300 corresponds to or includes an authentication server, as described herein, the logic configured to process information 310 may include logic configured to receive a request to confirm the identity of the first user, logic configured to determine whether or not there is a relationship between the first user or the first user device and a second user of a second user device or the second user device based on a first list of user interactions associated with the first user device and a second list of user interactions associated with the second user device, and/or logic configured to confirm the identity of the first user based on determining that there is a relationship between the first user or the first user device and the second user or the second user device. The processor included in the logic configured to process information 310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM memory, flash memory, ROM memory, EPROM memory, EEPROM memory, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to UE 200A or UE 200B as shown in FIG. 2, the logic configured to present information 320 can include the display 210A of UE 200A or the touchscreen display 205B of UE 200B. In a further example, the logic configured to present information 320 can be omitted for certain communication devices, such as network communication devices that do not have a local user (e.g., network switches or routers, remote servers such as the server 170, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to UE 200A or UE 200B as shown in FIG. 2, the logic configured to receive local user input 325 can include the keypad 220A, any of the buttons 215A or 210B through 225B, the touchscreen display 205B, etc. In a further example, the logic configured to receive local user input 325 can be omitted for certain communication devices, such as network communication devices that do not have a local user (e.g., network switches or routers, remote servers such as the server 170, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 4:
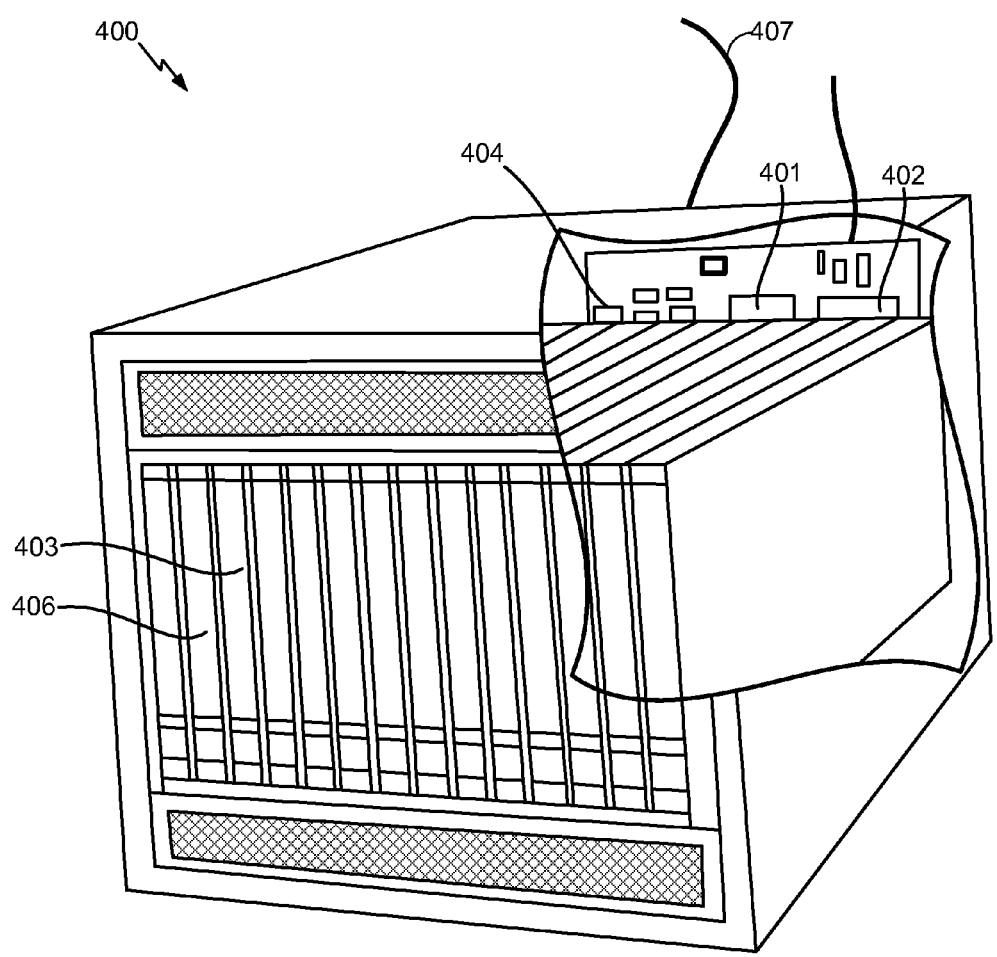
FIG. 4 illustrates an exemplary server according to various aspects of the disclosure.

The various embodiments may be implemented on any of a variety of commercially available server devices, such as server 400 illustrated in FIG. 4. In an example, the server 400 may correspond to one example configuration of the application server 170 described above. In FIG. 4, the server 400 includes a processor 400 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access ports 304 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to a UE implementation as in 205A or 205B as in FIG. 2.

In an aspect, where the server 400 corresponds to or includes an authentication server configured to confirm the identity of a first user of a first user device, the network access ports 404 and/or the processor 401 may be configured to receive a request to confirm the identity of the first user. For example, the network access ports 404 may receive the request over the network 407 and the processor 401 may receive the request via the network access ports 404. The processor 401 may be further configured to determine whether or not there is a relationship between the first user or the first user device and a second user of a second user device or the second user device based on a first list of user interactions associated with the first user device and a second list of user interactions associated with the second user device. The processor 401 and/or the network access ports 404 may be configured to confirm the identity of the first user based on determining that there is a relationship between the first user or the first user device and the second user or the second user device. For example, the processor 401 may confirm the identity of the first user and the network access ports 404 may send that confirmation to the requesting entity.

Figure 5:
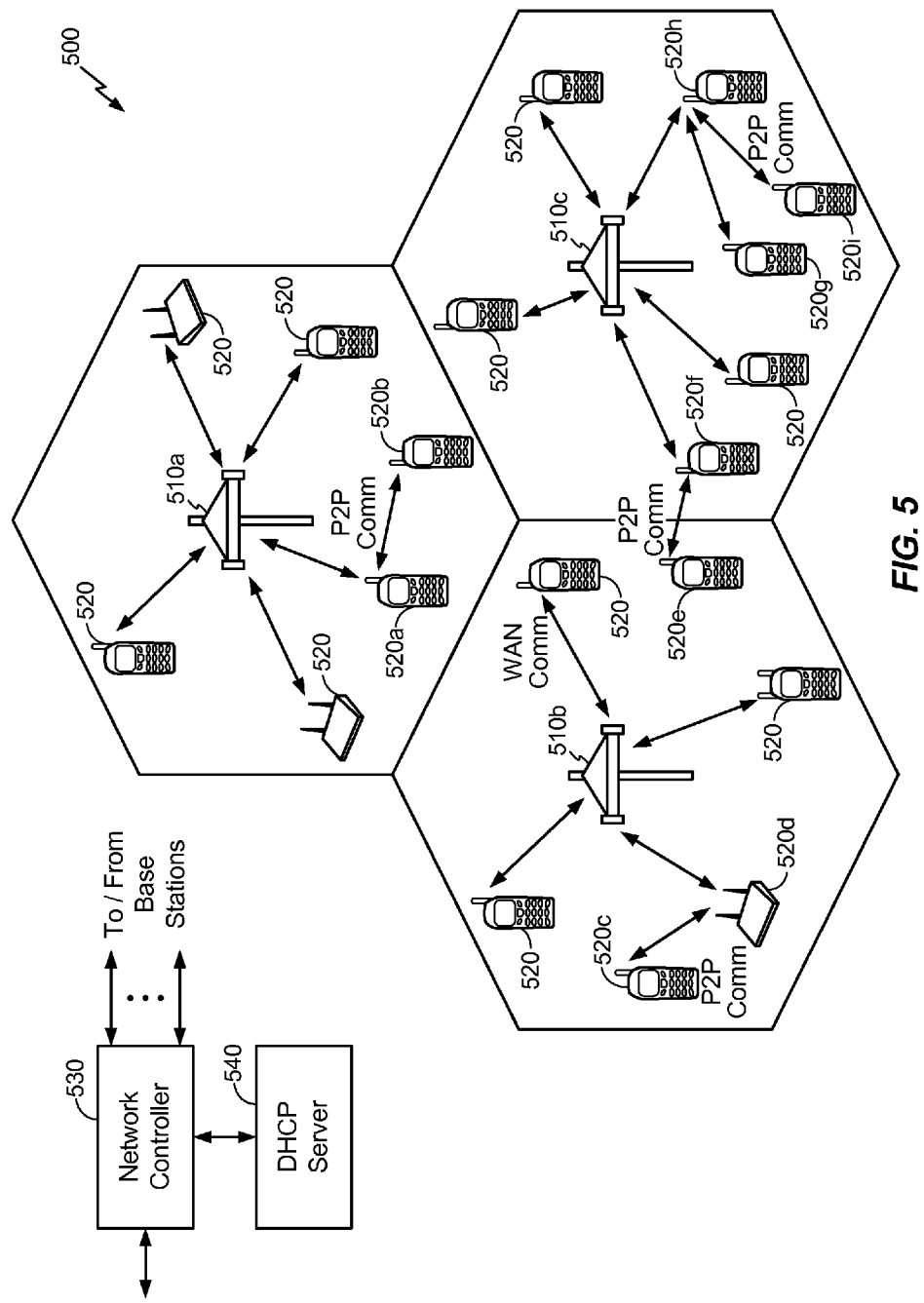
FIG. 5 illustrates a wireless communication network that may support discoverable peer-to-peer (P2P) services, in accordance with one aspect of the disclosure.

In general, UEs, such as telephones, tablet computers, laptop and desktop computers, certain vehicles, etc., can be configured to connect with each other either locally (e.g., Bluetooth, local Wi-Fi, etc.) or remotely (e.g., via cellular networks, through the Internet, etc.). Furthermore, certain UEs may also support proximity-based peer-to-peer (P2P) communication using certain wireless networking technologies (e.g., Wi-Fi, Bluetooth, Wi-Fi Direct, etc.) that enable devices to make a one-to-one connection or simultaneously connect to a group that includes several devices in order to directly communicate with one another. To that end, FIG. 5 illustrates an exemplary wireless communication network or WAN 500 that may support discoverable P2P services. For example, in one embodiment, the wireless communication network 500 may comprise an LTE network or another suitable WAN that includes various base stations 510 and other network entities. For simplicity, only three base stations 510a, 510b and 510c, one network controller 530, and one Dynamic Host Configuration Protocol (DHCP) server 540 are shown in FIG. 5. A base station 510 may be an entity that communicates with devices 520 and may also be referred to as a Node B, an evolved Node B (eNB), an access point, etc. Each base station 510 may provide communication coverage for a particular geographic area and may support communication for the devices 520 located within the coverage area. To improve network capacity, the overall coverage area of a base station 510 may be partitioned into multiple (e.g., three) smaller areas, wherein each smaller area may be served by a respective base station 510. In 3GPP, the term "cell" can refer to a coverage area of a base station 510 and/or a base station subsystem 510 serving this coverage area, depending on the context in which the term is used. In 3GPP2, the term "sector" or "cell-sector" can refer to a coverage area of a base station 510 and/or a base station subsystem 510 serving this coverage area. For clarity, the 3GPP concept of "cell" may be used in the description herein.

A base station 510 may provide communication coverage for a macro cell, a pico cell, a femto cell, and/or other cell types. A macro cell may cover a relatively large geographic area (e.g., several kilometers in radius) and may allow unrestricted access by devices 520 with service subscription. A pico cell may cover a relatively small geographic area and may allow unrestricted access by devices 520 with service subscription. A femto cell may cover a relatively small geographic area (e.g., a home) and may allow restricted access by devices 520 having association with the femto cell (e.g., devices 520 in a Closed Subscriber Group (CSG)). In the example shown in FIG. 5, wireless network 500 includes macro base stations 510a, 510b and 510c for macro cells. Wireless network 500 may also include pico base stations 510 for pico cells and/or home base stations 510 for femto cells (not shown in FIG. 5).

Network controller 530 may couple to a set of base stations 510 and may provide coordination and control for these base stations 510. Network controller 530 may be a single network entity or a collection of network entities that can communicate with the base stations via a backhaul. The base stations may also communicate with one another, e.g., directly or indirectly via wireless or wireline backhaul. DHCP server 540 may support P2P communication, as described below. DHCP server 540 may be part of wireless network 500, external to wireless network 500, run via Internet Connection Sharing (ICS), or any suitable combination thereof. DHCP server 540 may be a separate entity (e.g., as shown in FIG. 5) or may be part of a base station 510, network controller 530, or some other entity. In any case, DHCP server 540 may be reachable by devices 520 desiring to communicate peer-to-peer.

Devices 520 may be dispersed throughout wireless network 500, and each device 520 may be stationary or mobile. A device 520 may also be referred to as a node, user equipment (UE), a station, a mobile station, a terminal, an access terminal, a subscriber unit, etc. A device 520 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc. A device 520 may communicate with base stations 510 in the wireless network 500 and may further communicate peer-to-peer with other devices 520. For example, as shown in FIG. 5, devices 520a and 520b may communicate peer-to-peer, devices 520c and 520d may communicate peer-to-peer, devices 520e and 520f may communicate peer-to-peer, and devices 520g, 520h, and 520i may communicate peer-to-peer, while remaining devices 520 may communicate with base stations 510. As further shown in FIG. 5, devices 520a, 520d, 520f, and 520h may also communicate with base stations 500, e.g., when not engaged in P2P communication or possibly concurrent with P2P communication.

In the description herein, WAN communication may refer to communication between a device 520 and a base station 510 in wireless network 500, e.g., for a call with a remote entity such as another device 520. A WAN device is a device 520 that is interested or engaged in WAN communication. P2P communication refers to direct communication between two or more devices 520, without going through any base station 510. A P2P device is a device 520 that is interested or engaged in P2P communication, e.g., a device 520 that has traffic data for another device 520 within proximity of the P2P device. Two devices may be considered to be within proximity of one another, for example, if each device 520 can detect the other device 520. In general, a device 520 may communicate with another device 520 either directly for P2P communication or via at least one base station 510 for WAN communication.

In one embodiment, direct communication between P2P devices 520 may be organized into P2P groups. More particularly, a P2P group generally refers to a group of two or more devices 520 interested or engaged in P2P communication and a P2P link refers to a communication link for a P2P group. Furthermore, in one embodiment, a P2P group may include one device 520 designated a P2P group owner (or a P2P server) and one or more devices 520 designated P2P clients that are served by the P2P group owner. The P2P group owner may perform certain management functions such as exchanging signaling with a WAN, coordinating data transmission between the P2P group owner and P2P clients, etc. For example, as shown in FIG. 5, a first P2P group includes devices 520a and 520b under the coverage of base station 510a, a second P2P group includes devices 520c and 520d under the coverage of base station 510b, a third P2P group includes devices 520e and 520f under the coverage of different base stations 510b and 510c, and a fourth P2P group includes devices 520g, 520h and 520i under the coverage of base station 510c. Devices 520a, 520d, 520f, and 520h may be P2P group owners for their respective P2P groups and devices 520b, 520c, 520e, 520g, and 520i may be P2P clients in their respective P2P groups. The other devices 520 in FIG. 5 may be engaged in WAN communication.

In one embodiment, P2P communication may occur only within a P2P group and may further occur only between the P2P group owner and the P2P clients associated therewith. For example, if two P2P clients within the same P2P group (e.g., devices 520g and 520i) desire to exchange information, one of the P2P clients may send the information to the P2P group owner (e.g., device 520h) and the P2P group owner may then relay transmissions to the other P2P client. In one embodiment, a particular device 520 may belong to multiple P2P groups and may behave as either a P2P group owner or a P2P client in each P2P group. Furthermore, in one embodiment, a particular P2P client may belong to only one P2P group or belong to multiple P2P group and communicate with P2P devices 520 in any of the multiple P2P groups at any particular moment. In general, communication may be facilitated via transmissions on the downlink and uplink. For WAN communication, the downlink (or forward link) refers to the communication link from base stations 510 to devices 520, and the uplink (or reverse link) refers to the communication link from devices 520 to base stations 510. For P2P communication, the P2P downlink refers to the communication link from P2P group owners to P2P clients and the P2P uplink refers to the communication link from P2P clients to P2P group owners. In certain embodiments, rather than using WAN technologies to communicate P2P, two or more devices may form smaller P2P groups and communicate P2P on a wireless local area network (WLAN) using technologies such as Wi-Fi, Bluetooth, or Wi-Fi Direct. For example, P2P communication using Wi-Fi, Bluetooth, Wi-Fi Direct, or other WLAN technologies may enable P2P communication between two or more mobile phones, game consoles, laptop computers, or other suitable communication entities.

Figure 6:
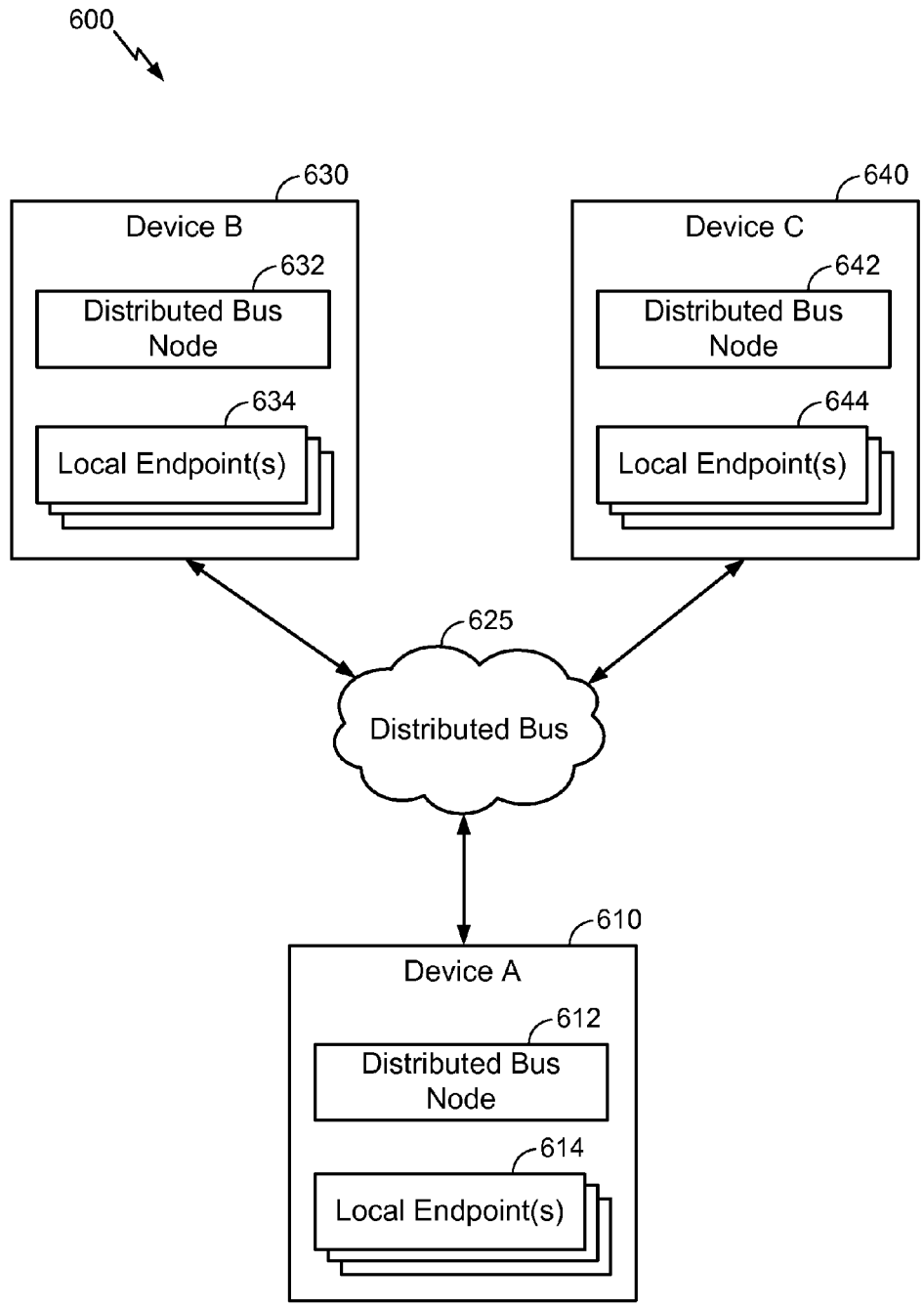
FIG. 6 illustrates an exemplary environment in which discoverable P2P services may be used to establish a proximity-based distributed bus over which various devices may communicate, in accordance with one aspect of the disclosure.

According to one aspect of the disclosure, FIG. 6 illustrates an exemplary environment 600 in which discoverable P2P services may be used to establish a proximity-based distributed bus over which various devices 610, 630, 640 may communicate. For example, in one embodiment, communications between applications and the like, on a single platform may be facilitated using an interprocess communication protocol (IPC) framework over the distributed bus 625, which may comprise a software bus used to enable application-to-application communications in a networked computing environment where applications register with the distributed bus 625 to offer services to other applications and other applications query the distributed bus 625 for information about registered applications. Such a protocol may provide asynchronous notifications and remote procedure calls (RPCs) in which signal messages (e.g., notifications) may be point-to-point or broadcast, method call messages (e.g., RPCs) may be synchronous or asynchronous, and the distributed bus 625 (e.g., a "daemon" bus process) may handle message routing between the various devices 610, 630, 640.

In one embodiment, the distributed bus 625 may be supported by a variety of transport protocols (e.g., Bluetooth, TCP/IP, Wi-Fi, CDMA, GPRS, UMTS, etc.). For example, according to one aspect, a first device 610 may include a distributed bus node 612 and one or more local endpoints 614, wherein the distributed bus node 612 may facilitate communications between local endpoints 614 associated with the first device 610 and local endpoints 634 and 644 associated with a second device 630 and a third device 640 through the distributed bus 625 (e.g., via distributed bus nodes 632 and 642 on the second device 630 and the third device 640). As will be described in further detail below with reference to FIG. 7, the distributed bus 625 may support symmetric multi-device network topologies and may provide a robust operation in the presence of device drops-outs. As such, the virtual distributed bus 625, which may generally be independent from any underlying transport protocol (e.g., Bluetooth, TCP/IP, Wi-Fi, etc.) may allow various security options, from unsecured (e.g., open) to secured (e.g., authenticated and encrypted), wherein the security options can be used while facilitating spontaneous connections with among the first device 610, the second device 630, and the third device 640 without intervention when the various devices 610, 630, 640 come into range or proximity to each other.

Figure 7:
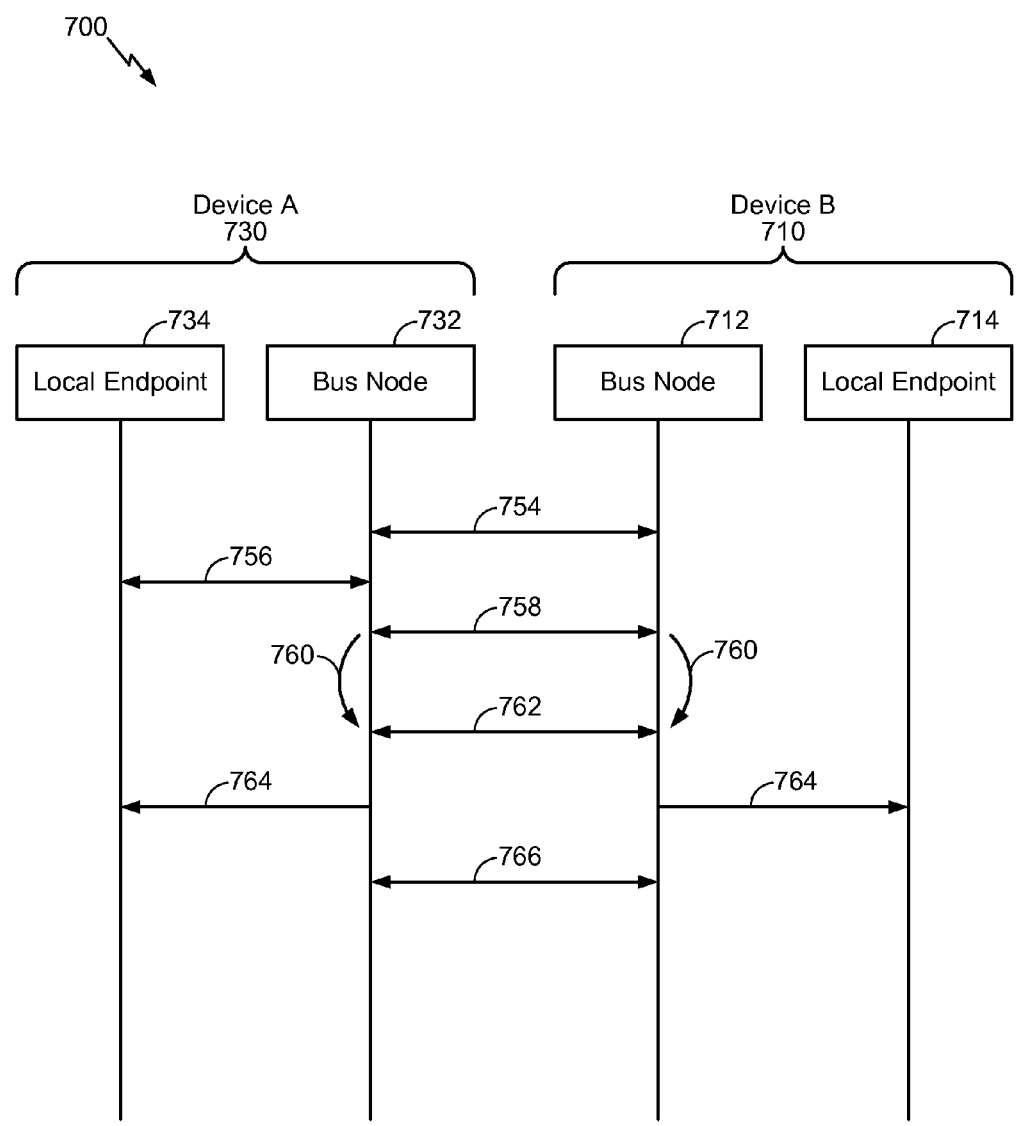
FIG. 7 illustrates an exemplary message sequence in which discoverable P2P services may be used to establish a proximity-based distributed bus over which various devices may communicate, in accordance with one aspect of the disclosure.

According to one aspect of the disclosure, FIG. 7 illustrates an exemplary message sequence 700 in which discoverable P2P services may be used to establish a proximity-based distributed bus over which a first device ("Device A") 710 and a second device ("Device B") 730 may communicate. Generally, Device A 710 may request to communicate with Device B 730, wherein Device A 710 may a include local endpoint 714 (e.g., a local application, service, etc.), which may make a request to communicate in addition to a bus node 712 that may assist in facilitating such communications. Further, Device B 730 may include a local endpoint 734 with which the local endpoint 714 may be attempting to communicate in addition to a bus node 732 that may assist in facilitating communications between the local endpoint 714 on the Device A 710 and the local endpoint 734 on Device B 730.

In one embodiment, the bus nodes 712 and 732 may perform a suitable discovery mechanism at message sequence step 754. For example, mechanisms for discovering connections supported by Bluetooth, TCP/IP, UNIX, or the like may be used. At message sequence step 756, the local endpoint 714 on Device A 710 may request to connect to an entity, service, endpoint etc, available through bus node 712. In one embodiment, the request may include a request-and-response process between local endpoint 714 and bus node 712. At message sequence step 758, a distributed message bus may be formed to connect bus node 712 to bus node 732 and thereby establish a P2P connection between Device A 710 and Device B 730. In one embodiment, communications to form the distributed bus between the bus nodes 712 and 732 may be facilitated using a suitable proximity-based P2P protocol (e.g., the AllJoyn™ software framework designed to enable interoperability among connected products and software applications from different manufacturers to dynamically create proximal networks and facilitate proximal P2P communication). Alternatively, in one embodiment, a server (not shown) may facilitate the connection between the bus nodes 712 and 732. Furthermore, in one embodiment, a suitable authentication mechanism may be used prior to forming the connection between bus nodes 712 and 732 (e.g., SASL authentication in which a client may send an authentication command to initiate an authentication conversation). Still further, during message sequence step 758, bus nodes 712 and 732 may exchange information about other available endpoints (e.g., local endpoints 644 on Device C 640 in FIG. 6). In such embodiments, each local endpoint that a bus node maintains may be advertised to other bus nodes, wherein the advertisement may include unique endpoint names, transport types, connection parameters, or other suitable information.

In one embodiment, at message sequence step 760, bus node 712 and bus node 732 may use obtained information associated with the local endpoints 734 and 714, respectively, to create virtual endpoints that may represent the real obtained endpoints available through various bus nodes. In one embodiment, message routing on the bus node 712 may use real and virtual endpoints to deliver messages. Further, there may one local virtual endpoint for every endpoint that exists on remote devices (e.g., Device A 710). Still further, such virtual endpoints may multiplex and/or de-multiplex messages sent over the distributed bus (e.g., a connection between bus node 712 and bus node 732). In one aspect, virtual endpoints may receive messages from the local bus node 712 or 732, just like real endpoints, and may forward messages over the distributed bus. As such, the virtual endpoints may forward messages to the local bus nodes 712 and 732 from the endpoint multiplexed distributed bus connection. Furthermore, in one embodiment, virtual endpoints that correspond to virtual endpoints on a remote device may be reconnected at any time to accommodate desired topologies of specific transport types. In such an aspect, UNIX based virtual endpoints may be considered local and as such may not be considered candidates for reconnection. Further, TCP-based virtual endpoints may be optimized for one hop routing (e.g., each bus node 712 and 732 may be directly connected to each other). Still further, Bluetooth-based virtual endpoints may be optimized for a single pico-net (e.g., one master and n slaves) in which the Bluetooth-based master may be the same bus node as a local master node.

At message sequence step 762, the bus node 712 and the bus node 732 may exchange bus state information to merge bus instances and enable communication over the distributed bus. For example, in one embodiment, the bus state information may include a well-known to unique endpoint name mapping, matching rules, routing group, or other suitable information. In one embodiment, the state information may be communicated between the bus node 712 and the bus node 732 instances using an interface with local endpoints 714 and 734 communicating with using a distributed bus based local name. In another aspect, bus node 712 and bus node 732 may each may maintain a local bus controller responsible for providing feedback to the distributed bus, wherein the bus controller may translate global methods, arguments, signals, and other information into the standards associated with the distributed bus. At message sequence step 764, the bus node 712 and the bus node 732 may communicate (e.g., broadcast) signals to inform the respective local endpoints 714 and 734 about any changes introduced during bus node connections, such as described above. In one embodiment, new and/or removed global and/or translated names may be indicated with name owner changed signals. Furthermore, global names that may be lost locally (e.g., due to name collisions) may be indicated with name lost signals. Still further, global names that are transferred due to name collisions may be indicated with name owner changed signals and unique names that disappear if and/or when the bus node 712 and the bus node 732 become disconnected may be indicated with name owner changed signals.

As used above, well-known names may be used to uniquely describe local endpoints 714 and 734. In one embodiment, when communications occur between Device A 710 and Device B 730, different well-known name types may be used. For example, a device local name may exist only on the bus node 712 associated with Device A 710 to which the bus node 712 directly attaches. In another example, a global name may exist on all known bus nodes 712 and 732, where only one owner of the name may exist on all bus segments. In other words, when the bus node 712 and bus node 732 are joined and any collisions occur, one of the owners may lose the global name. In still another example, a translated name may be used when a client is connected to other bus nodes associated with a virtual bus. In such an aspect, the translated name may include an appended end (e.g., a local endpoint 714 with well-known name "org.foo" connected to the distributed bus with Globally Unique Identifier "1234" may be seen as "G1234.org.foo").

At message sequence step 766, the bus node 712 and the bus node 732 may communicate (e.g., broadcast) signals to inform other bus nodes of changes to endpoint bus topologies. Thereafter, traffic from local endpoint 714 may move through virtual endpoints to reach intended local endpoint 734 on Device B 730. Further, in operation, communications between local endpoint 714 and local endpoint 734 may use routing groups. In one aspect, routing groups may enable endpoints to receive signals, method calls, or other suitable information from a subset of endpoints. As such, a routing name may be determined by an application connected to a bus node 712 or 732. For example, a P2P application may use a unique, well-known routing group name built into the application. Further, bus nodes 712 and 732 may support registering and/or de-registering of local endpoints 714 and 734 with routing groups. In one embodiment, routing groups may have no persistence beyond a current bus instance. In another aspect, applications may register for their preferred routing groups each time they connect to the distributed bus. Still further, groups may be open (e.g., any endpoint can join) or closed (e.g., only the creator of the group can modify the group). Yet further, a bus node 712 or 732 may send signals to notify other remote bus nodes or additions, removals, or other changes to routing group endpoints. In such embodiments, the bus node 712 or 732 may send a routing group change signal to other group members whenever a member is added and/or removed from the group. Further, the bus node 712 or 732 may send a routing group change signal to endpoints that disconnect from the distributed bus without first removing themselves from the routing group.

To protect the privacy and security of user information stored at a remote server (e.g., a server accessible over the Internet), the remote server will determine whether or not the user is authorized to access the information. Similarly, for the user to perform some action at or with the assistance of the remote server, such as making a bank transfer, the remote server will determine whether or not the user is authorized to perform the action. Typically, determining whether or not a user is authorized to access information or perform an action includes some way of authenticating that the user is who he says that he is. That is, if the remote server can verify that the user is the owner of the user information or the bank account (authentication), the user is allowed to access the information or make the bank transfer (authorization).

Client-server user authentication is typically performed using a unique key known only to the client and the server. This can be a very limited system, however, because if the key becomes known to a malicious third party, it is no longer secure. Additionally, the user may have to remember multiple "username" and "password" combinations for each website and/or application the user would like to log onto.

Implicit authorization to access a resource can also be granted based on physical proximity. A user device can be authorized to access a resource based on its physical proximity to the user device that controls, administers, or otherwise authorizes access to the resource. For example, given two peer devices in proximity to each other, where one peer device controls access to a resource, the fact that the other peer device is proximate the first peer device can imply that the other peer device is authorized to access the resource. That is, the fact that the first peer device permits the second peer device to come into proximity with it can indicate the relationship between the peer devices and imply that the second peer device is authorized to access the resource controlled by the first peer device.

Physical proximity may be determined by a proximity check, such as a Listen Location (LILO) proximity check, a Bluetooth pairing, communication over the same local wireless network, or any other interaction between two UEs that indicates that they are physically proximate to each other.

Using proximity alone to authorize access to a resource, however, is only appropriate in certain locations, such as a user's home. As such, before granting access to a resource to another user device, the authorizing user device should determine whether or not the other user device is in such a location. The user, for example, may define in which locations other user devices are permitted access to resources by virtue of their proximity In an aspect, the type of authorization may depend on the type of resource. For example, a visitor's user device may be granted full access to a homeowner's stereo system when the visitor's user device is proximate the homeowner's user device. However, under no circumstances may the visitor's user device be granted access to the homeowner's bank account based only on their proximity. Rather, the homeowner may need to grant additional permission to access certain resources.

Proximity may also include user devices within the same physical boundary, not just user devices that can be detected via a proximity check. For example, once a visitor's user device has been granted access to another user's home, it may be considered 'proximal' to, and thus have access to, any device in the entire house, even if the visitor's user device is not proximate the homeowner's user device.

Accordingly, permissions can define domains in which a user device is authorized to access any available resources. That is, once a user device is within a certain domain, such as a user's home, further authentication is not necessary. The domain can be defined by physical proximity (e.g., a proximity check or within the same physical boundary), by access (e.g., based on some authentication check), and/or by virtual proximity.

Virtual proximity can include interactions between multiple user devices over a period of time, not just user devices that are currently physically proximate to each other. Most users are in proximity to a number of peers over the course of each day. Utilizing these interactions (or virtual proximity) as a basis for an authentication system would distribute the authentication process, thereby making it more secure.

UEs in the proposed authentication system track interactions with other UEs, such as proximity detections, text messages, multimedia messages, phone calls, emails, etc. As described above, proximity detection may include a proximity check, such as a LILO proximity check, a Bluetooth pairing, communication over the same local wireless network, or any other interaction between two UEs that indicates that they are proximate to each other. Peer relationships can also be determined from UE interactions with GPS satellites.

A user/UE may interact with many different UEs. These other UEs may belong to family members, co-workers, roommates, friends, or acquaintances of the user, for example. Alternatively, the other UEs may include Internet of Things (IoT) devices belonging to the user, such as the user's refrigerator, washing machine, dish washer, thermostat, etc. Based on the interactions with these other UEs, the UE can build a user interaction table.

Each UE on a network may store a user interaction table and can upload its user interaction table to a server on request or periodically, such as once per day. The server can include a database to store a user interaction table for each UE in the system. Alternatively, instead of the UE storing its interaction table, the interactions could be uploaded to the server as they occur in real time and added to the interaction table on the server that corresponds to the UE.

In an embodiment, the server can cross-reference these user interaction tables to verify the identity of (i.e., authenticate) a user/UE logging on to a third-party server. This system could work entirely in the background, allowing users to maximize their time in other venues. Additionally, it can eliminate the need for users to recall and type in their username and password for each logon request.

As an example operation of the proposed authentication system, a user named Sarah may wish to logon to her bank's website. Accordingly, the client on her smartphone sends a request to an authentication server. The authentication server searches Sarah's user interaction table for the ten most recent interactions. Sarah's most recent interactions may have been with, for example, users Jane, Mark, Jill, Bill, Dan, Tara, Frank, and Ray.

The authentication server cross-references the user interaction tables for Jane, Mark, Jill, Bill, Dan, Tara, Frank, and Ray to Sarah's user interaction table. The authentication server is able to verify that Sarah interacted with, for example, Jane, Jill, and Ray based on their stored user interaction tables.

The authentication server also attempts to cross-reference the user interaction tables for each of the remaining peers, i.e., Mark, Bill, Tara, Frank, and Dan. In this example, Mark has powered off his phone and the authentication server is therefore unable to retrieve his user interaction table (in this case, Mark's interaction table may be stored on his phone rather than the server, or the version on the server may be older than the interaction being cross-referenced). However, if the authentication server can verify five of the last ten peer interactions based on the user interaction tables, it will authenticate Sarah's logon request to the bank website. If it authenticates her, Sarah will be logged on to her bank's website without having to recall a username and password.

Referring now to the user interaction tables in more detail, user interaction tables can be organized by identifiers of the UEs to which they correspond. A user interaction table can store an identifier of the user/UE, the other user/UE, the type of interaction (e.g., proximity, email, text message, phone call, etc.), the time of the interaction (e.g., the time the interaction began/ended), and/or the duration of the interaction. The user interaction table may store all interactions for each UE or only a certain number of interactions, such as the last ten interactions or all interactions in the last two days.

Table 1 illustrates an exemplary user interaction table according to an embodiment of the disclosure.

TABLE 1

| User | Peer | Type | Timestamp |
| --- | --- | --- | --- |
| UserID | Peer1_ID | Proximity | 12:52:06 PM |
| UserID | Peer3_ID | Email | 12:44:55 PM |
| UserID | Peer4_ID | Proximity | 12:20:15 PM |
| UserID | Peer2_ID | Text Message | 11:58:25 AM |

Although Table 1 illustrates the timestamp as the time alone, it may also include the date of the interaction.

Figure 8:
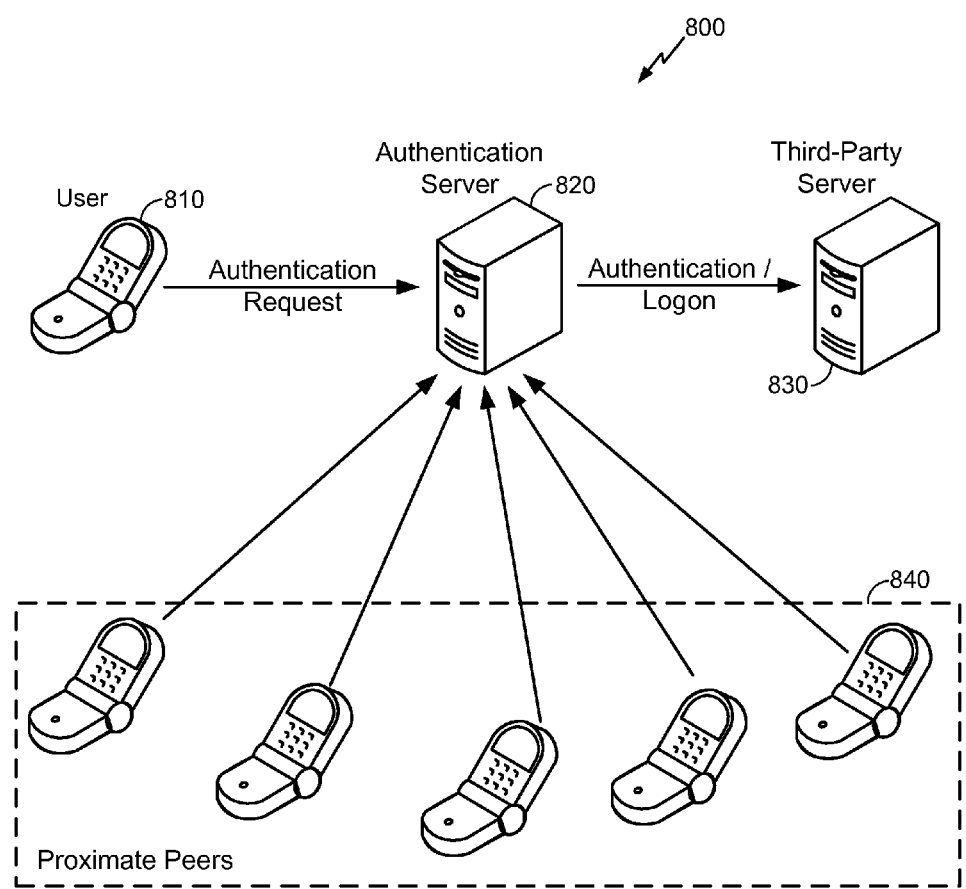
FIG. 8 illustrates an exemplary authentication system according to an embodiment of the disclosure.

FIG. 8 illustrates an exemplary authentication system 800 according to an embodiment of the disclosure. The system 800 includes an authenticating UE 810, an authentication server 820, a third-party server 830, and a number of UEs 840 with which the UE 810 has interacted. The UE 810 may be any user device capable of communicating with the authentication server 820 and logging on to the third-party server 830, such as UE 200A/200B. The UEs 840 may be user devices belonging to other users or user devices belonging to the user of UE 810, such as IoT devices belonging to the user. The UEs 840 may be any device capable of interacting with the UE 810, such as detecting the proximity of the UE 810, and communicating with the authentication server 820.

In FIG. 8, the authentication server 820 and the third party server 830 are illustrated as two separate entities. In such a situation, the authentication server 820 may authenticate users for multiple third party servers, including third party server 830. However, the authentication server 820 may alternatively reside on the third party server 830. That is, the third party server 830 may authenticate users, rather than there being a separate authentication server that can authenticate users for a plurality of third party servers. The authentication server 820 may be any server configured to perform the functionality described herein, such as server 400 in FIG. 4.

The authentication server 820 can store user interaction tables for each user/UE in the network, including UE 810 and UEs 840. The UE 810 may have interacted with each of the UEs 840 at some point in time. Each user may decide how he or she wishes his or her respective user interaction table to be stored. For example, some users may wish to store it on their UE and have the authentication server 820 request it, or only the necessary entries, as needed, while other users may wish to simply upload their interactions to their user interaction tables stored on the authentication server 820.

In an embodiment, when a user, via the user's UE 810, wishes to logon to the third-party server 830, which may be, for example, an email server or a banking server, the UE 810 sends an authentication request to the authentication server 820. The authentication request may include, or be followed by, the interaction table for UE 810. Alternatively, the authentication server 820 may retrieve the user interaction table corresponding to the UE 810. As described above, the user interaction table may store the interactions that UE 810 has had with UEs 840 and the time of those interactions. The user interaction table may store all interactions for each UE or only a certain number of interactions, such as the last ten interactions or all interactions in the last two days.

In response to receiving the authentication request from the UE 810, the authentication server 820 retrieves the user interaction tables for each user/UE in the user interaction table for UE 810 or only a certain number of user interaction tables. For example, the authentication server 820 may only retrieve the user interaction tables for at least the number of UEs of UEs 840 that are required to authenticate UE 810. For example, the authentication server 820 may retrieve the user interaction tables for the first ten UEs of UEs 840, all UEs of UEs 840 with which the UE 810 has interacted in the last two days, or only the number of UEs 840 required to authenticate UE 810, e.g., five out of the last ten.

The authentication server 820 may then cross-reference the user interaction table for UE 810 with the retrieved user interaction tables to verify that UE 810 actually interacted with the cross-referenced UEs 840 and at the time indicated in the user interaction table. For example, if the user interaction table for UE 810 indicates that UE 810 was proximate a given UE at a given time, the authentication server 820 will retrieve that UE's user interaction table to determine whether or not there is a corresponding entry for the interaction, which would indicate that UE 810 was actually proximate that UE at the given time.

The authentication server 820 can perform this verification for the number of UEs required to authenticate the UE 810. For example, if the UE 810 can only be authenticated if five of the last ten interactions are verified, then the authentication server 820 will perform this verification check for each UE in the user interaction table for the UE 810 until it verifies five UEs or has cross-referenced ten UEs, whichever comes first.

If the authentication server 820 authenticates the UE 810 based on the retrieved user interaction tables, the authentication server 820 can send an authentication/logon message to the third-party server 830, indicating that the UE 810 has been authenticated. The authentication message can include the user's logon credentials for the third party server 830, such as a username and password, or some other agreed upon authentication message, such as a private key. The authentication server 820 could store the logon credentials for the user so that the user only has to enter them once, rather than the user having to enter them every time he or she tries to access the third party server 830. The third-party server 830 can then permit access to the UE 810.

While the example in FIG. 8 illustrates the UE 810 communicating with the third party server 830 via the authentication server 820, the UE 810 could first access the third party server 830, which could redirect the UE 810 to the authentication server 820. Alternatively, the UE 810 could access the third party server 830, and the third party server 830 could communicate with the authentication server 820 to determine whether or not the UE 810 is authorized. The third party server 830 could either send the UE 810's user interaction table to the authorization server 820, or the UE 810 could do so itself.

Figure 9:
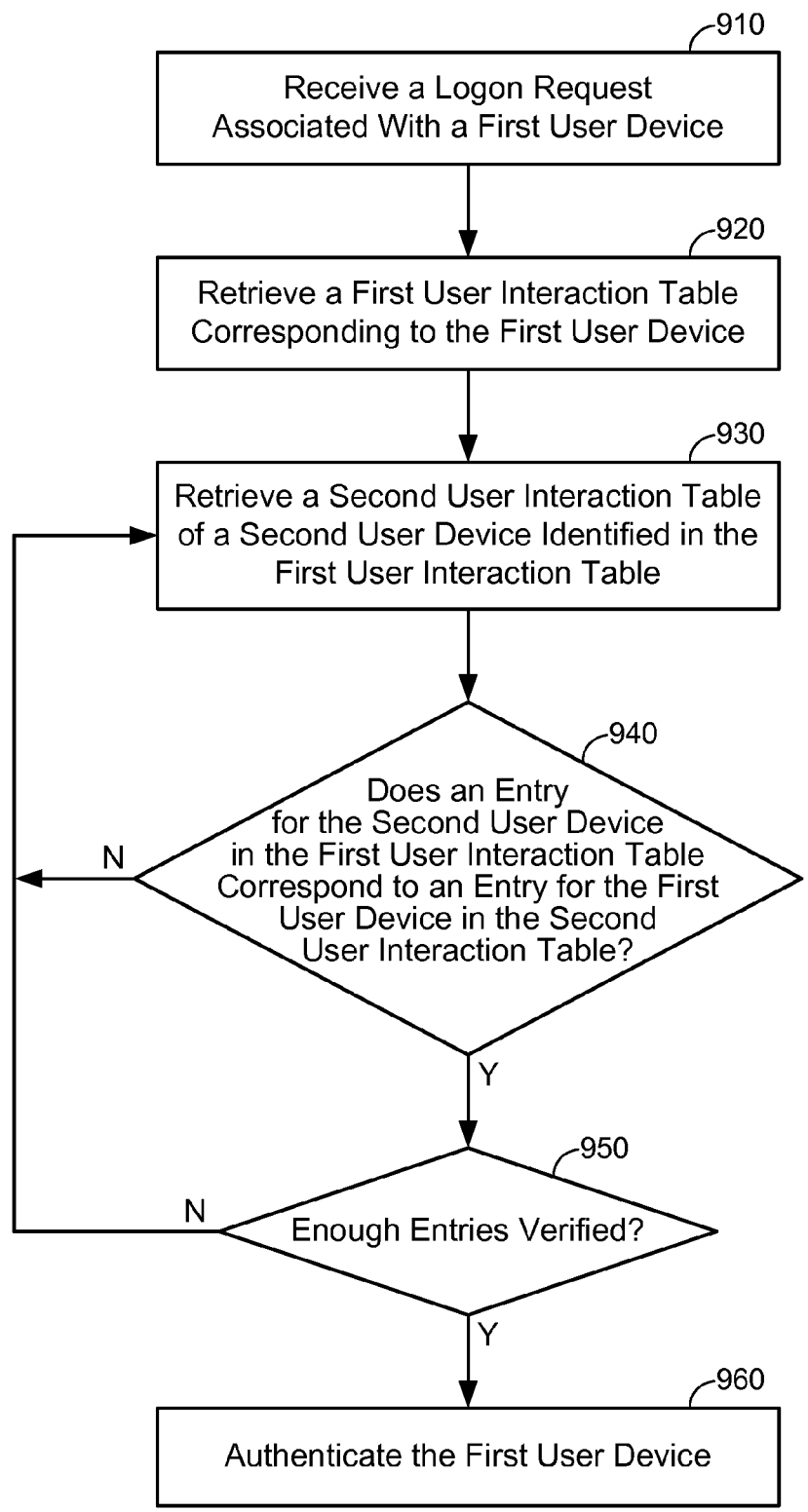
FIG. 9 illustrates an exemplary flow for peer-based authentication according to an embodiment of the disclosure.

FIG. 9 illustrates an exemplary flow for peer-based authentication according to an embodiment of the disclosure. The flow illustrated in FIG. 9 may be performed by an authentication server, such as authentication server 820 in FIG. 8, or a third party server, such as third party server 830 in FIG. 8.

At 910, the server receives a logon request from a first user device, such as user device 810 in FIG. 8. The first user device may be a smartphone, a laptop computer, a tablet computer, a desktop computer, a PDA, or any other user device capable of logging on to a third-party server. The logon request may be a logon request to log onto a third-party server.

At 920, the server retrieves a first user interaction table corresponding to the first user device. The server may retrieve the first user interaction table from the first user device or from a database linked to the server. The server may receive the first user interaction table from a third party server that the first user device is attempting to access. The first user interaction table may include an entry for a second user devices with which the first user device has interacted.

At 930, the server retrieves a second user interaction table corresponding to a second user device with which the first user device has interacted, such as a UE 840. The server may retrieve the second user interaction table from the second user device or from a database linked to the server. The second user device may be an IoT device belonging to the user of the first user device, such as a refrigerator, a washing machine, a thermostat, etc., or a user device belonging to another user, such as a smartphone, a laptop computer, a tablet computer, a PDA, etc., or even an IoT device belonging to another user. That is, the second user device may be any device capable of interacting with the first user device and communicating with the server.

At 940, the server determines whether or not an entry for the second user device in the first user interaction table corresponds to an entry for the first user device in the second user interaction table. Where the entry for the first user device includes a first interaction type and/or a first timestamp, and where the entry for the second user device includes a second interaction type and/or a second timestamp, the determining may include determining whether or not the first interaction type matches the second interaction type and/or determining whether or not the first timestamp matches the second timestamp. The server may match one or both of the interaction type and the timestamp. The interaction type may be one of a proximity detection, a short messaging service (SMS) message, a multimedia messaging service (MMS) message, a phone call, or an email.

If at 940 the server determines that an entry for the second user device in the first user interaction table does not correspond to an entry for the first user device in the second user interaction table, then the flow returns to 930 and the server retrieves a user interaction table for another user device identified in the first user interaction table. If, however, the server determines that an entry for the second user device in the first user interaction table does correspond to an entry for the first user device in the second user interaction table, then the flow proceeds to 950.

At 950, the server determines whether enough entries have been verified. As discussed above, this may be five out of ten entries, all entries within a certain time period, or the like. If not enough entries have been verified, then the flow returns to 930 and the server retrieves a user interaction table for another user device identified in the first user interaction table. If, however, enough entries have been verified, then the flow proceeds to 960.

At 960, the server authenticates the first user device based on the verifying. The authentication may include sending a message to the third-party server indicating that the first user device is authenticated. The server may store logon credentials for the third-party server corresponding to the first user device and send those logon credentials in the authentication message.

Although the server can authenticate the first user device based on only one other proximate user devices, the more proximate user devices the server uses to authenticate the first user device, the more confidence there can be in the authentication.

As illustrated in FIG. 9, in order for the server to verify a user's identity, it must receive the interaction tables generated at the UE 810 and the UEs 840. However, security is a concern when transmitting the full interaction table. Transmitting a complete interaction table is inherently dangerous, as the transmission can be intercepted and spoofed.

Instead, UEs 810 and 840 can store their interaction tables locally and the server (either authentication server 820 or third-party server 830) can query the interaction tables stored at the UEs 810 and 840 with specific questions. This prevents the interaction table from being intercepted and spoofed, and as such, keeps the information in it accurate and secure.

For example, assume that two users, Dana and Jake, were at the same geo-location at lunchtime. Their interaction tables can be queried with the following questions to determine the probability that they had lunch together: "How many people did you have lunch with in the last week?" "Are you the type of person who has lunch with people often?" Finding out that Dana and Jake are both people who often eat lunch with others, combined with their geo-location data, can allow the authentication server 820 to assume that they ate lunch together.

This statistical confirmation provides a significant security improvement. The more data patterns that can be identified and the more statistics that can be generated, the higher the level of confidence that can be attained. Additionally, after an initial learning period, the questions can be better tailored to the user, thereby maximizing the amount of relevant data received with the minimum number of questions.

Figure 10:
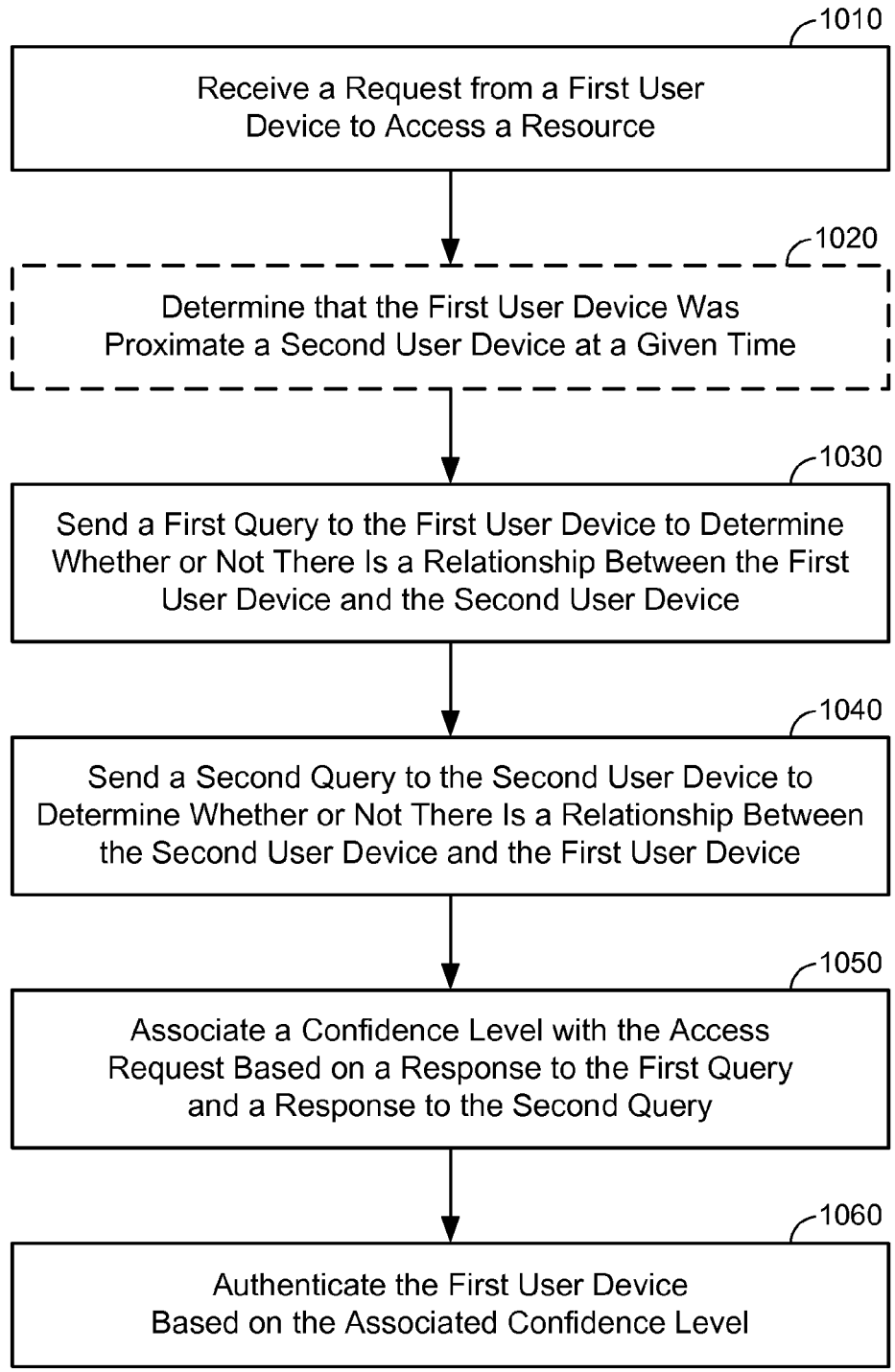
FIG. 10 illustrates an exemplary flow for authenticating a user device without transmitting the user device's interaction table according to an embodiment of the disclosure.

The specific aspects of authenticating UE 810 by querying UEs 810 and 840 will now be described with respect to FIG. 10. FIG. 10 illustrates an exemplary flow for authenticating a user device without transmitting the user device's interaction table. The flow illustrated in FIG. 10 may be performed by the authentication server 820 or a supervisor device of a user's home network. The supervisor device may belong to the user of UE 810, for example. For simplicity, the flow illustrated in FIG. 10 will be described as being performed by the authentication server 820, however, as is apparent, the flow may be performed by the above-described supervisor device.

At 1010, the authentication server 820 receives a request from a first user device, such as UE 810, to access a resource. The resource may be the user of UE 810's bank account or home network, for example.

At 1020, the authentication server 820 optionally determines that the first user device was proximate a second user device, such as one of UEs 840, at a given time. Determining that the first user device was proximate the second user device may include, for example, determining that the first user device and the second user device were both attached to the same network access point at the given time. This may include retrieving an identifier of the same network access point from the first user device and retrieving a list of user devices that were attached to the same network access point at the given time. The network access point may be a wireless local area network access point or a cellular network access point, for example.

Alternatively, determining that the first user device was proximate the second user device may include determining that the first user device and the second user device were within a threshold geographic distance of each other based on location information received from the first user device and location information received from the second user device. The location information may include the identifier(s) of the network access point(s) to which the user devices are attached, GPS coordinates of the user devices, and/or the like.

At 1030, the authentication server 820 sends a first query to the first user device to determine whether or not there is a relationship between the first user device and the second user device, or between a user of the first user device and a user of the second user device. Determining whether or not there is a relationship may include determining whether or not the first user device interacted with the second user device, or a user of the first user device interacted with a user of the second user device, at the given time. If the authentication server 820 determines that the first user device was proximate the second user device at the given time, the authentication server 820 can send the second query in response to that determination.

The first user device may determine the response to the first query based on information in the interaction table stored on the first user device. Alternatively, the first user device may determine the response to the first query by displaying the first query to the user of the first user device and receiving the response from the user of the first user device. The response to the first query may be an affirmative response, a negative response, or a number, for example. The response to the first query should not include information that the user of the first user device has determined to be private.

At 1040, the authentication server 820 sends a second query to the second user device to determine whether or not there is a relationship between the second user device and the first user device, or between the user of the second user device and the user of the first user device. Determining whether or not there is a relationship may include determining whether or not the second user device interacted with the first user device, or the user of the second user device interacted with the user of the first user device, at the given time. The second user device may be a user device belonging to a second user, or an IoT device belonging to the user of the first device.

Note, as discussed above, the flow of FIG. 10 may be performed by a supervisor device of a user's home network. In that case, no information needs to be transmitted over a public network. Rather, all communication illustrated in FIG. 10 would occur over the user's home network.

The second user device may determine the response to the second query based on information in the interaction table stored on the second user device. Alternatively, the second user device may determine the response to the second query by displaying the second query to the user of the second user device and receiving the response from the user of the second user device. The response to the second query may be an affirmative response, a negative response, or a number, for example. The response to the second query should not include information that the user of the second user device has determined to be private.

Block 1020 is optional because the authentication server 820 may send the second query without knowing that the first user device was proximate the second user device at the given time. In this case, proximity means that if the user devices performed a proximity check, such as a LILO proximity check, they would be within range of each other. The authentication server 820 may send the second query to each user device within a threshold geographic distance of the location of the first user device. The location of the first user device may be the first user device's current location or the location of the first user device at the given time, if known. This may depend on how long ago the given time was.

For example, if the given time is only a few hours before the current time, the authentication server 820 may assume that the first user device and the second user device are still in the same general location, and perhaps even still served by the same network access point. As such, sending the second query to each user device being served by the same network access point as the first user device will likely result in sending the query to a user device that interacted with the first user device at the given time. As will be appreciated, the more recent the given time, the more likely it will be to discover user devices that interacted with the first user device. However, a recent given time provides less security, as the first user device may have been lost or stolen before the given time.

Although FIG. 10 illustrates the authentication server 820 sending a single query to each user device, the authentication server 820 may send multiple queries to each device. Additionally, the second query may requests the same information as the first query. For example, the authentication server 820 may ask both user devices if the users went out for lunch that day. The authentication server 820 may also ask how many people the users had lunch with that day. The authentication server 820 may send both queries at the same time, or send the second query only if the first query was answered in the affirmative. If the answers to these questions match, the authentication server 820 can associate a higher confidence level with the access request at 1050.

At 1050, the authentication server 820 associates a confidence level with the access request based on a response to the first query and a response to the second query. The associating may include associating a lower confidence level if the response to the first query does not match the response to the second query than if the response to the first query matches the response to the second query. The confidence level indicates a confidence that the user of the first user device is authorized to access the resource.

Although not illustrated, the authentication server 820 can send a plurality of queries to a plurality of user devices to determine whether or not there is a relationship between any of the plurality of user devices and the first user device, or between any users of the plurality of user devices and the user of the first user device. In this case, the associating at 1050 may include associating the confidence level with the access request based on the response to the first query and responses to the plurality of queries.

Likewise, the authentication server 820 can send queries to user devices that were or might have been proximate the first user device at different time, not just the given time. As will be appreciated, the more user devices the authentication server 820 queries, the more likely it is to find user devices with which the first user device has interacted, and thus the higher the confidence level it can assign.

At 1060, the authentication server 820 authenticates the first user device based on the associated confidence level. As illustrated, the authentication server 820 can authenticate the first user device without retrieving the interaction table from the first user device. If the associated confidence level is below a threshold, the authentication server 820 can deny the request for access to the resource. Otherwise, if the associated confidence level is above a threshold, the authentication server 820 can allow the request for access to the resource.

Figure 11:
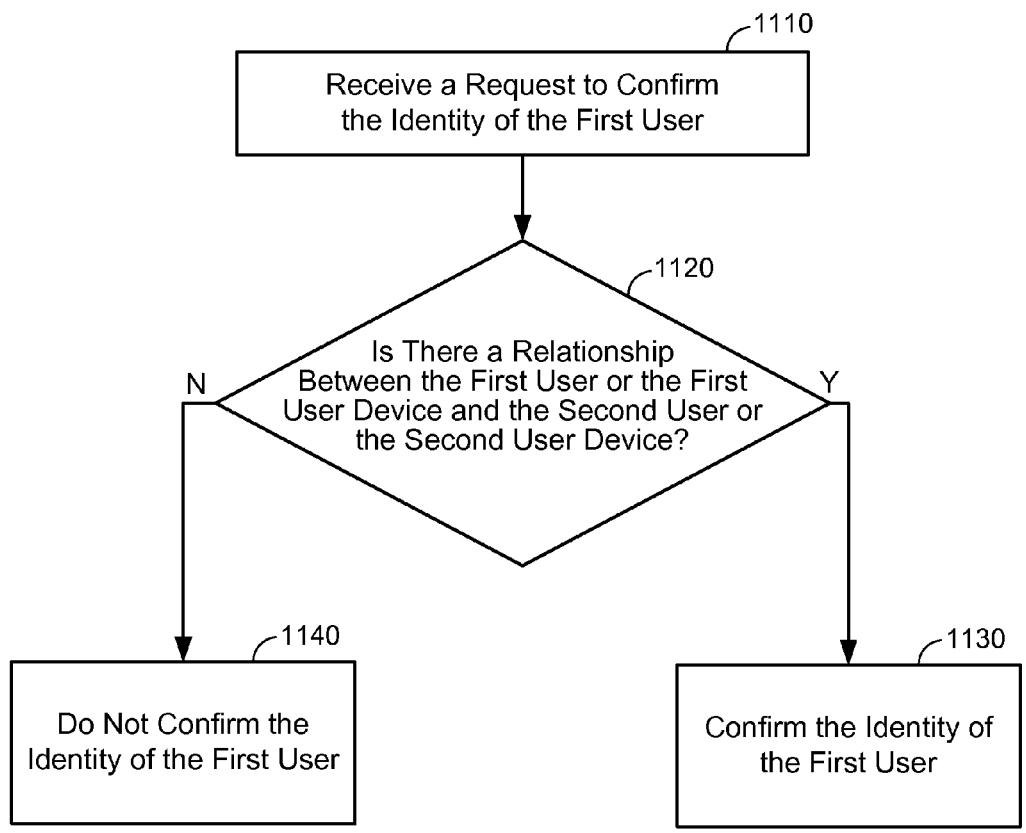
FIG. 11 illustrates an exemplary flow for confirming an identity of a first user of a first user device according to an aspect of the disclosure.

FIG. 11 illustrates an exemplary flow for confirming an identity of a first user of a first user device according to an aspect of the disclosure. The flow illustrated in FIG. 11 may be performed by the authentication server 820 or a supervisor device of a user's home network, such as the first user's home network. For simplicity, the flow illustrated in FIG. 11 will be described as being performed by the authentication server 820, however, as is apparent, the flow may be performed by the above-described supervisor device.

At 1110, the authentication server 820 receives a request to confirm the identity of the first user. The request may be in the form of, for example, a logon request, such as at 910 of FIG. 9 or a request to access a resource, such as at 1010 of FIG. 10.

At 1120, the authentication server 820 determines whether or not there is a relationship between the first user or the first user device and a second user of a second user device or the second user device based on a first list of user interactions associated with the first user device and a second list of user interactions associated with the second user device. The second user device may be any of UEs 840 in FIG. 8. The first list of user interactions may include an entry for an interaction with the second user device, as described above.

In an aspect, the determining at 1120 may include determining whether or not the entry for the interaction with the second user device in the first list of user interactions corresponds to an entry for an interaction with the first user device in the second list of user interactions, as at 940 of FIG. 9. The authentication server 820 may determine that there is a relationship between the first user or the first user device and the second user or the second user device based on the entry for the interaction with the second user device in the first list of user interactions corresponding to the entry for the interaction with the first user device in the second list of user interactions, as at 940 of FIG. 9.

In another aspect, the determining at 1120 may include sending a first query to the first user device, sending a second query to the second user device, and determining whether or not there is a relationship between the first user or the first user device and the second user or the second user device based on a response to the first query and a response to the second query, as discussed above with reference to 1030-1050 of FIG. 10.

At 1130, the authentication server 820 confirms the identity of the first user based on determining that there is a relationship between the first user or the first user device and the second user or the second user device. Although not illustrated in FIG. 11, the authentication server 820 may generate an identity score for the first user device based on the determining, such as at 1050 of FIG. 10. In that case, the confirming at 1130 may include confirming the identity of the first user based on the identity score. If the identity score is above a threshold, the identity of the first user is confirmed, and the first user can be authenticated as at 960 of FIG. 9 and 1060 of FIG. 10. If, at 1120, the authentication server 820 determines that there is not a relationship between the first user or first user device and the second user or the second user device, then at 1140, the authentication server 820 does not confirm the identity of the first user. The authentication server 820 may instead retrieve one or more additional user interaction tables as discussed above with reference to FIG. 9 or send queries to one or more other user devices as described above with reference to FIG. 10, as appropriate. Alternatively, the authentication server 820 may deny the request to confirm the identity of the first user, thereby not authenticating the first user.

Figure 12:
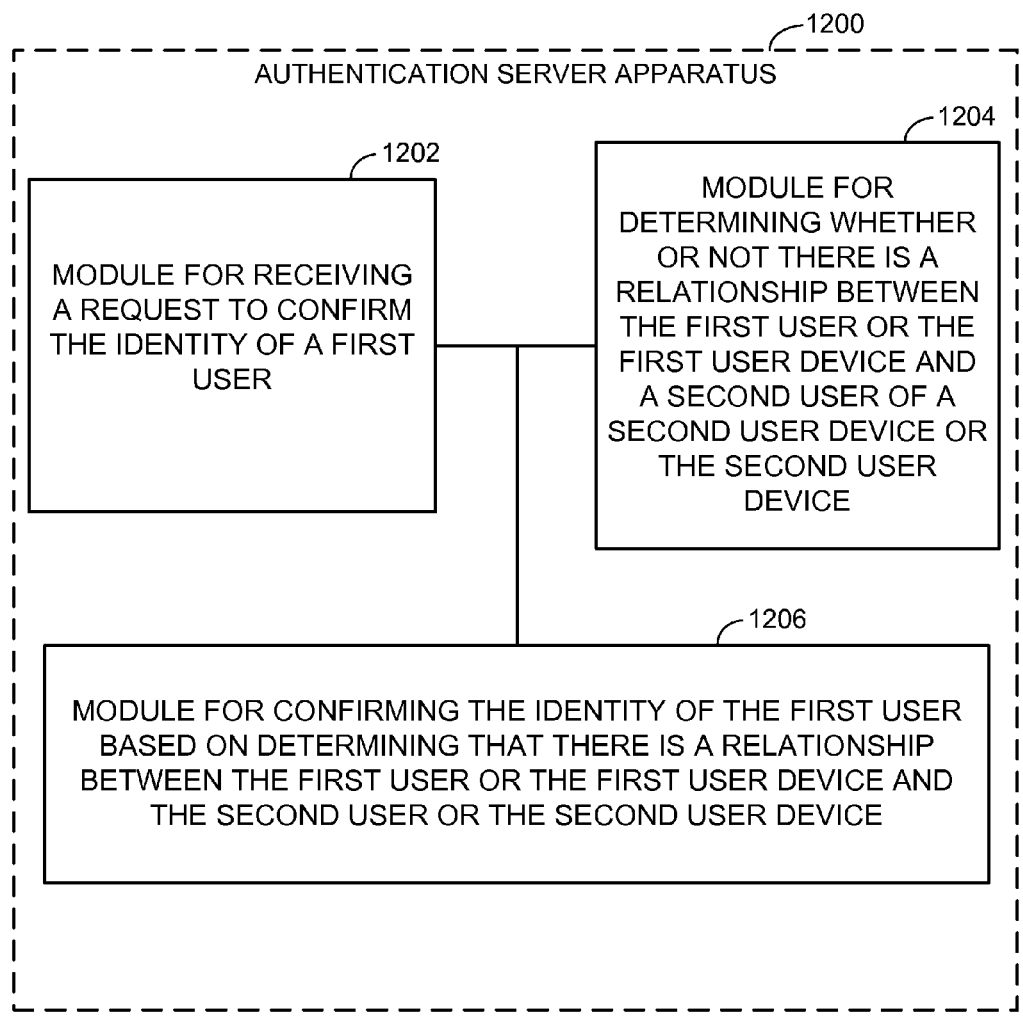
FIG. 12 is another simplified block diagram of several sample aspects of an apparatus configured to support communication as taught herein.

FIG. 12 illustrates an example authentication server apparatus 1200 represented as a series of interrelated functional modules. A module for receiving 1202 may correspond at least in some aspects to, for example, a communication device and/or a processing system as discussed herein, such as network access ports 404 and/or processor 401 in FIG. 4. A module for determining 1204 may correspond at least in some aspects to, for example, a processing system as discussed herein, such as processor 401 in FIG. 4. A module for confirming 1206 may correspond at least in some aspects to, for example, a communication device and/or a processing system as discussed herein, such as network access ports 404 and/or processor 401 in FIG. 4.

The functionality of the modules of FIG. 12 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 12, as well as other components and functions described herein, may be implemented using any suitable means. Such means also may be implemented, at least in part, using corresponding structure as taught herein. For example, the components described above in conjunction with the "module for" components of FIG. 12 also may correspond to similarly designated "means for" functionality. Thus, in some aspects one or more of such means may be implemented using one or more of processor components, integrated circuits, or other suitable structure as taught herein.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for confirming an identity of a first user of a first user device, comprising:
   receiving, at a device, an authentication request to confirm the identity of the first user; determining, by the device, whether or not there is a relationship between the first user or the first user device and a second user of a second user device or the second user device based on a first list of user interactions associated with the first user device and a second list of user interactions associated with the second user device, wherein the first list of user interactions includes an entry for an interaction with the second user device, and wherein the determining whether or not there is a relationship between the first user or the first user device and the second user or the second user device comprises determining whether or not the entry for the interaction with the second user device in the first list of user interactions corresponds to an entry for an interaction with the first user device in the second list of user interactions;

determining, by the device, that there is a relationship between the first user or the first user device and the second user or the second user device based on the entry for the interaction with the second user device in the first list of user interactions corresponding to the entry for the interaction with the first user device in the second list of user interactions; and authenticating, by the device, the first user based on determining that there is the relationship between the first user or the first user device and the second user or the second user device.

2. The method of claim 1, further comprising:
retrieving the first list of user interactions from the first user device; and
retrieving the second list of user interactions from the second user device.

3. The method of claim 1, further comprising:
retrieving the first list of user interactions from an authentication server; and
retrieving the second list of user interactions from the authentication server.

4. The method of claim 1, wherein the entry for the interaction with the first user device comprises a first interaction type and a first timestamp, and wherein the entry for the interaction with the second user device comprises a second interaction type and a second timestamp.

5. The method of claim 4, wherein the first interaction type comprises one of a proximity detection, a short messaging service (SMS) message, a multimedia messaging service (MMS) message, a phone call, or an email.

6. The method of claim 4, wherein the determining whether or not the entry for the interaction with the second user device corresponds to the entry for the interaction with the first user device comprises:
determining whether or not the first interaction type matches the second interaction type and/or whether or not the first timestamp matches the second timestamp.

7. The method of claim 1, wherein the first list of user interactions includes an entry for an interaction with the second user device, and wherein the determining comprises:
sending a first query to the first user device;
sending a second query to the second user device; and
determining whether or not there is a relationship between the first user or the first user device and the second user or the second user device based on a response to the first query and a response to the second query.

8. The method of claim 7, further comprising:
determining that the first user device was proximate the second user device at a given time,
wherein sending the second query is performed in response to determining that the first user device was proximate the second user device at the given time.

9. The method of claim 7, wherein determining whether or not there is a relationship between the first user or the first user device and the second user or the second user device based on the response to the first query and the response to the second query comprises determining whether or not the first user device interacted with the second user device, or a user of the first user device interacted with a user of the second user device, at a given time based on the response to the first query and the response to the second query.

10. The method of claim 7, wherein sending the second query comprises sending the second query without knowing that the second user device was proximate the first user device at a given time.

11. The method of claim 7, wherein the first user device determines the response to the first query based on information stored in the first list of user interactions.

12. The method of claim 7, wherein the first list of user interactions is stored at the first user device and the second list of user interactions is stored at the second user device.

13. The method of claim 7, wherein the first user device determines the response to the first query by displaying the first query to the first user of the first user device and receiving an indication of the response from the first user.

14. The method of claim 7, wherein the second query requests the same information as the first query.

15. The method of claim 1, wherein the authentication request to confirm the identity of the first user comprises a logon request associated with the first user device,
the method further comprising:
generating an identity score for the first user device based on the determining,
wherein the authenticating comprises authenticating the first user based on the identity score.

16. An apparatus for confirming an identity of a first user of a first user device, comprising:
a network interface configured to receive an authentication request to confirm the identity of the first user; and
at least one processor configured to:
determine whether or not there is a relationship between the first user or the first user device and a second user of a second user device or the second user device based on a first list of user interactions associated with the first user device and a second list of user interactions associated with the second user device, wherein the first list of user interactions includes an entry for an interaction with the second user device, and wherein the at least one processor being configured to determine whether or not there is a relationship between the first user or the first user device and the second user or the second user device comprises the at least one processor being configured to determine whether or not the entry for the interaction with the second user device in the first list of user interactions corresponds to an entry for an interaction with the first user device in the second list of user interactions;
determine that there is a relationship between the first user or the first user device and the second user or the second user device based on the entry for the interaction with the second user device in the first list of user interactions corresponding to the entry for the interaction with the first user device in the second list of user interactions; and
authenticate the first user based on the determination that there is the relationship between the first user or the first user device and the second user or the second user device.

17. The apparatus of claim 16, wherein the entry for the interaction with the first user device comprises a first interaction type and a first timestamp, and wherein the entry for the interaction with the second user device comprises a second interaction type and a second timestamp.

18. The apparatus of claim 17, wherein the at least one processor being configured to determine whether or not the entry for the interaction with the second user device corresponds to the entry for the interaction with the first user device comprises:
the at least one processor being configured to determine whether or not the first interaction type matches the second interaction type and/or whether or not the first timestamp matches the second timestamp.

19. The apparatus of claim 16, wherein the first list of user interactions includes an entry for an interaction with the second user device, and wherein the at least one processor is further configured to:
send a first query to the first user device;
send a second query to the second user device; and
determine whether or not there is a relationship between the first user or the first user device and the second user or the second user device based on a response to the first query and a response to the second query.

20. The apparatus of claim 19, wherein the at least one processor is further configured to:
determine that the first user device was proximate the second user device at a given time,
wherein the at least one processor sends the second query in response to a determination that the first user device was proximate the second user device at the given time.

21. The apparatus of claim 19, wherein the at least one processor being configured to determine whether or not there is a relationship between the first user or the first user device and the second user or the second user device based on the response to the first query and the response to the second query comprises the at least one processor being configured to determine whether or not the first user device interacted with the second user device, or a user of the first user device interacted with a user of the second user device, at a given time based on the response to the first query and the response to the second query.

22. The apparatus of claim 19, wherein the at least one processor being configured to send the second query comprises the at least one processor being configured to send the second query without knowing that the second user device was proximate the first user device at a given time.

23. The apparatus of claim 19, wherein the first user device determines the response to the first query based on information stored in the first list of user interactions.

24. The apparatus of claim 19, wherein the first user device determines the response to the first query by displaying the first query to the first user of the first user device and receiving an indication of the response from the first user.

25. The apparatus of claim 19, wherein the second query requests the same information as the first query.

26. The apparatus of claim 16, wherein the authentication request to confirm the identity of the first user comprises a logon request associated with the first user device,
wherein the at least one processor is further configured to generate an identity score for the first user device based on the determination, and
wherein the at least one processor being configured to authenticate comprises the at least one processor being configured to authenticate the first user based on the identity score.

27. An apparatus for confirming an identity of a first user of a first user device, comprising:
means for receiving an authentication request to confirm the identity of the first user;
means for determining whether or not there is a relationship between the first user or the first user device and a second user of a second user device or the second user device based on a first list of user interactions associated with the first user device and a second list of user interactions associated with the second user device, wherein the first list of user interactions includes an entry for an interaction with the second user device, and wherein the means for determining whether or not there is a relationship between the first user or the first user device and the second user or the second user device comprises means for determining whether or not the entry for the interaction with the second user device in the first list of user interactions corresponds to an entry for an interaction with the first user device in the second list of user interactions;
means for determining that there is a relationship between the first user or the first user device and the second user or the second user device based on the entry for the interaction with the second user device in the first list of user interactions corresponding to the entry for the interaction with the first user device in the second list of user interactions; and
means for authenticating the first user based on determining that there is the relationship between the first user or the first user device and the second user or the second user device.

28. A non-transitory computer-readable medium for confirming an identity of a first user of a first user device, comprising:
at least one instruction to receive an authentication request to confirm the identity of the first user;
at least one instruction to determine whether or not there is a relationship between the first user or the first user device and a second user of a second user device or the second user device based on a first list of user interactions associated with the first user device and a second list of user interactions associated with the second user device, wherein the first list of user interactions includes an entry for an interaction with the second user device, and wherein the at least one instruction to determine whether or not there is a relationship between the first user or the first user device and the second user or the second user device comprises at least one instruction to determine whether or not the entry for the interaction with the second user device in the first list of user interactions corresponds to an entry for an interaction with the first user device in the second list of user interactions;
at least one instruction to determine that there is a relationship between the first user or the first user device and the second user or the second user device based on the entry for the interaction with the second user device in the first list of user interactions corresponding to the entry for the interaction with the first user device in the second list of user interactions; and
at least one instruction to authenticate the first user based on determining that there is the relationship between the first user or the first user device and the second user or the second user device.

* * * * *